Aug. 1, 1933.  R. S. A. DOUGHERTY  1,920,294
MEASURING MECHANISM
Filed Aug. 16, 1928  4 Sheets-Sheet 1

INVENTOR
Robert S.A. Dougherty

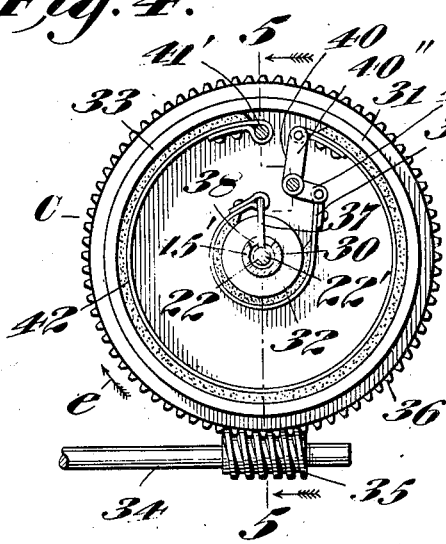
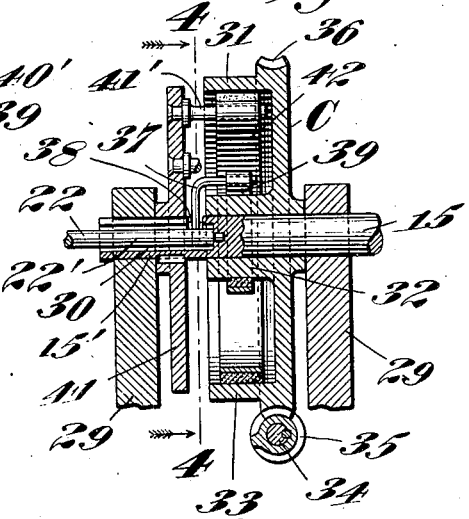
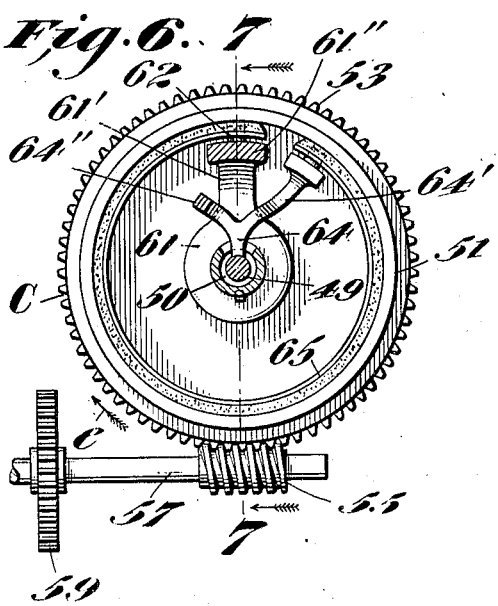

Aug. 1, 1933. R. S. A. DOUGHERTY 1,920,294
MEASURING MECHANISM
Filed Aug. 16, 1928 4 Sheets-Sheet 3
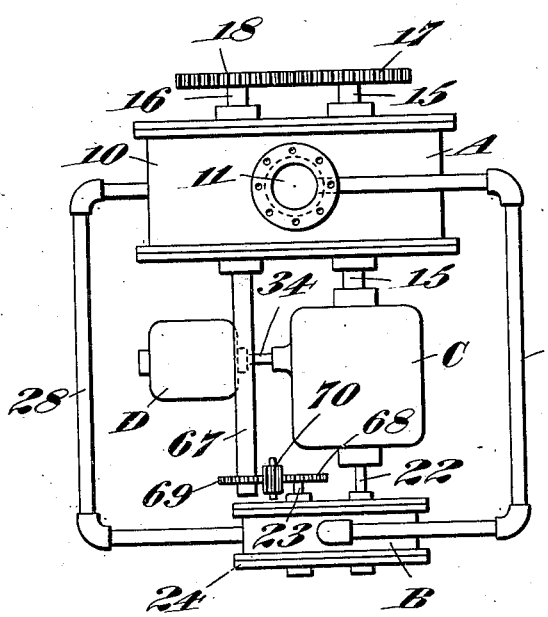
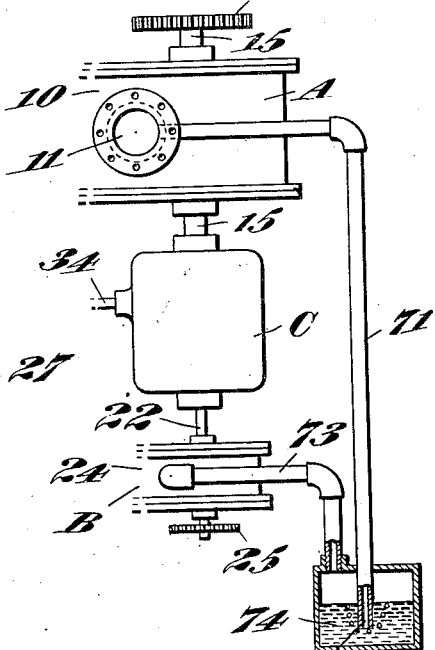
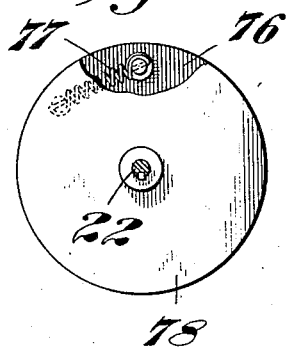
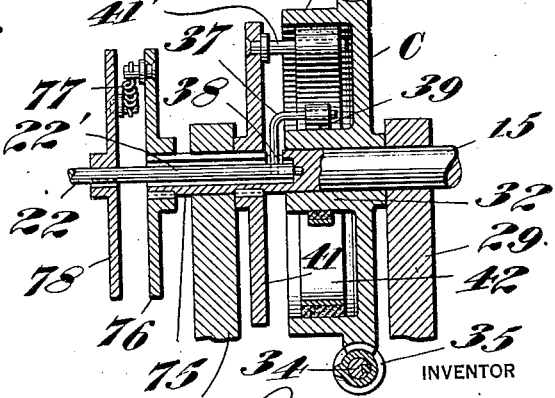
INVENTOR
Robert S. A. Dougherty.

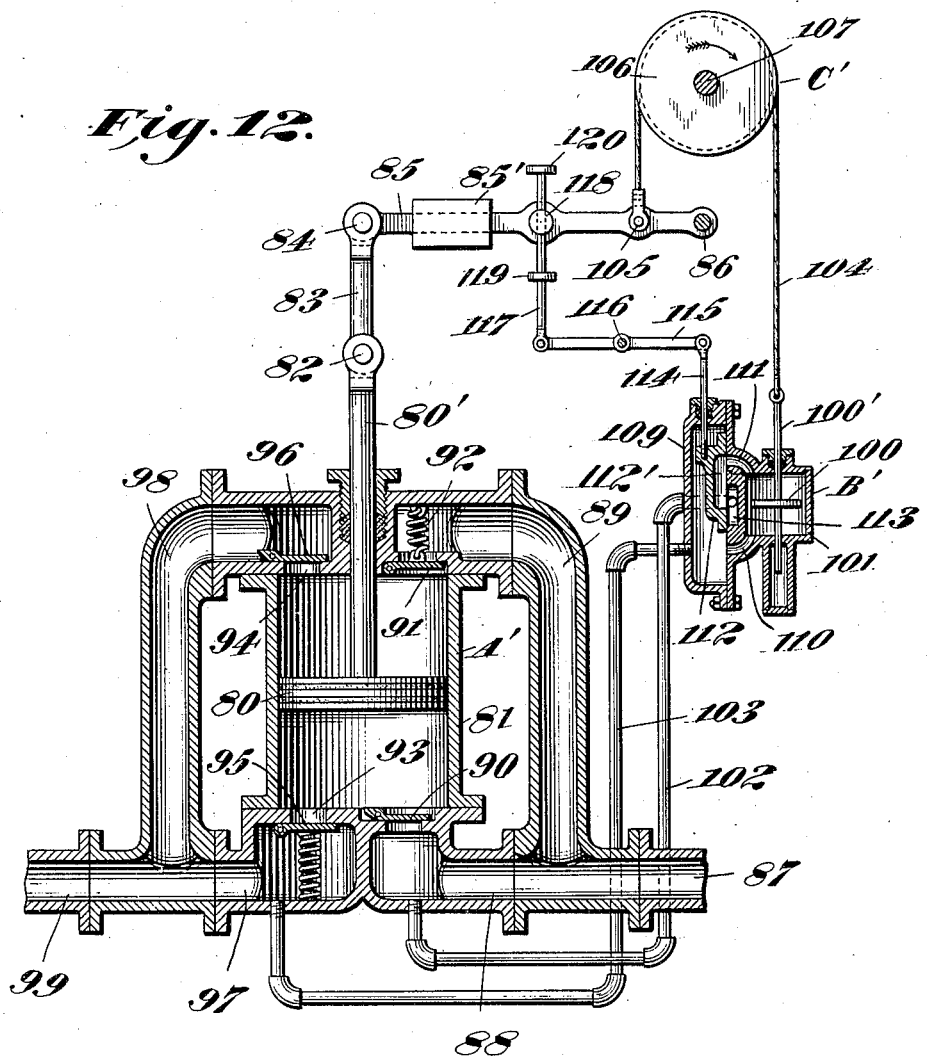

Patented Aug. 1, 1933

1,920,294

UNITED STATES PATENT OFFICE 1,920,294

MEASURING MECHANISM

Robert S. A. Dougherty, Bethlehem, Pa.

Application August 16, 1928. Serial No. 299,967

12 Claims. (Cl. 73—167.)

My invention is directed to mechanisms in which the flow of a fluid through a conduit is accompanied by movement of a member or members which in amount bears a definite relation to the amount of fluid passing through the conduit.

This invention comprises a pump or valve in a conduit, a power driven member, and a control motor easily actuated by predetermined pressure conditions of the fluid tending to produce flow of the fluid, the action of this control motor effecting a driving relationship between the driven member and the pump or valve and inducing action of the pump to effect such flow. The amount of movement of the power driven pump or of a member operatively connected to the pump bears a definite relation to the amount of fluid which passes through the conduit. This is a measuring device in the broad sense that the amount of movement of the pump or a member driven thereby is a measure of the amount of fluid passing through the conduit. This measuring relationship is true regardless of the use to which the member may be put and whether or not the device is used as a meter of the fluid flow.

In each of the illustrative examples which follow the flow of fluid is produced as the result of the action of a pump mounted in a conduit, this pump being so mounted as not to be directly operated by ordinary differentials in pressure on the two sides thereof. By-passing this pump is another conduit in which is mounted a control motor adapted to be easily operated whenever the differential of pressures on the two sides of the pump reaches a predetermined value. Means connect the control motor and pump adapted, during the movement of the control motor, to engage a power driven member whereby the pump is operated during the movement of the control motor and with an energy input from the power driven member.

Referring to the accompanying drawings:

Fig. 4 is a view, partly in section, of the mechanism for connecting the control motor to the pump, including the means for driving the pump from an external source of power;

Fig. 5 is a sectional view taken at right angles to Fig. 4 and along line 5—5;

Figure 1:
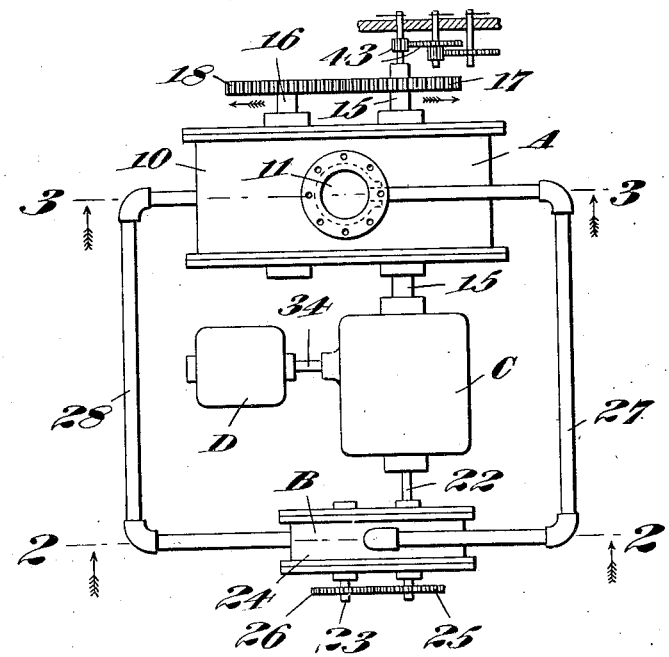
Fig. 1 is a diagram of a fluid meter embodying my inventive principle.
Figure 2:
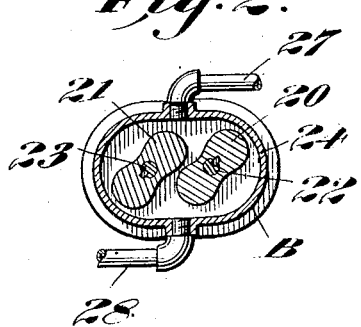
Fig. 2 is a section through the control motor of the system of Fig. 1, taken at right angles to the plane of Fig. 1, along line 2—2.
Figure 3:
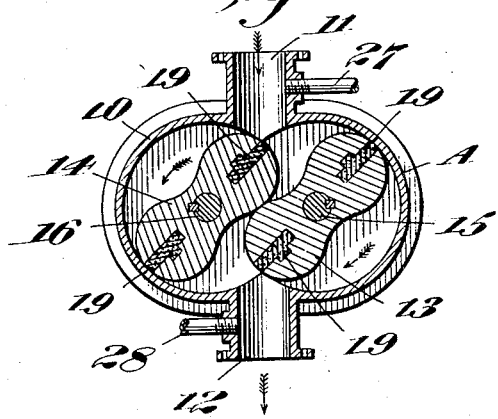
Fig. 3 is a similar section of the pump along the line 3—3 of Fig. 1.

Figs. 6 and 7 are views similar to 4 and 5 respectively of a modification of the connecting mechanism, Figs. 4 and 5 indicating a device to be used in a one way flow system while Figs. 6 and 7 show a device adapted to be used where there is a two way flow;

Fig. 8 is a diagram of the device similar to that of Fig. 1 but modified in the manner in which one of the elements of the control motor is connected to the remaining structure;

Fig. 9 is a diagram of a portion of a flow system in which means are provided for producing a predetermined drop in pressure on the two sides of the pump;

Fig. 10 is an end view of a portion of a modified mechanism for connecting the control motor and pump and for feeding energy from an external source of energy; this particular modification being adapted to be used to produce a flow in which there is rise in pressure, that is the pressure being lower on the supply side of the pump;

Fig. 11 is a sectional view of the same modification, taken at right angles to the view of Fig. 10; and Fig. 12 is a diagrammatic showing, principally in section, of a flow system embodying the principle of my invention but in which the active parts of the pumping mechanism and control motor are reciprocatory rather than rotary.

In Figs. 1 to 5, inclusive, showing the invention applied to a gas meter, a pumping device A or rotary metering means is adapted to be operated whenever the pressure on the consumption side becomes less than that on the supply side, the rotatable elements of the pump being operatively connected through a gear train to a registering or indicating device. To make the device as accurate as possible the movable elements of the pump, which are here shown as being of the "blower" type, are tightly mounted in their casing, and also closely fit each other, to avoid any gas leakage. Consequently these elements are not easily turned and therefore are incapable of being directly operated by moderate pressure differentials. In accordance with the principle of my invention pump A is not operated directly by the gas differential, but by means of a control motor B which turns the pump elements of pump A through the intermediary of device C, energy being fed to pump A from motor D, this transfer of energy also being effected through the instrumentality of device C.

Referring to the pumping mechanism A: Here the main flow of the fluid passes through pump casing 10 having gas inlet and outlet pipes 11 and 12, respectively. Within casing 10, are rotors 13 and 14, of the ordinary "blower" type, mounted on shafts 15 and 16, respectively, rotatively mounted in the casing and geared together by spur gears 17 and 18, externally of the casing. Rotors 13 and 14 are provided with packing elements 19 which are adapted to bring about a gas tight fit between the rotors and the casing to prevent leakage of gas. Shaft 15 is positively driven in a manner to be indicated later, shaft 16 being driven from shaft 15 through the intermediary of gears 17 and 18, the rotors thus being rotated in opposite directions in the manner usual to rotors in pumps or similar structures of the blower type.

Control motor B is mechanically similar to the structure of pump A. Rotors 20 and 21 are mounted on shafts 22 and 23, respectively, rotatably mounted in casing 24. These shafts are geared together by means of gears 25 and 26, rotors 20 and 21 therefore rotating in opposite directions, as is true of the corresponding rotors in the pump mechanism A. These rotors, however, unlike the rotors of mechanism A, are loosely mounted in the casing and also loosely mounted with respect to each other, in order that they offer but little resistance and to permit of them being easily rotated with but a slight difference in gaseous pressure.

Inlet pipe 11 of pump A is connected to casing 24 of control motor B by a by-pass pipe 27 and the outlet pipe 12 of pump A is connected by by-pass 28 to casing 24 of the control motor B, pipe 27 being an inlet pipe to the control motor B and pipe 28 an outlet. Because of the slight friction and other forces of resistance in control motor B, gaseous pressures so slight as to have no effect upon the rotors of pump A easily operate the rotors in control motor B.

Rotary movement of shaft 22 due to the flow of gas in control motor B is communicated to shaft 15 of the pump A by means of device C, energy to shaft 15 from the external motor D being fed through the instrumentality of this same device C. The structure of this device C and its relation to control motor B and pump A will now be described.

Shaft 15 of the pump A has a portion 15' extending from the casing rotatably mounted in supports 29. Shaft 22 of control motor B likewise has an extended portion 22', coaxial with shaft extension 15', the outer end of which is rotatable in the recess 30 of shaft extension 15'. Drum 31 having a hub portion 32 and the circular flange 33 is rotatably mounted on shaft extension 15' and is continuously driven in the direction of the arrow e by the external motor D through the intermediary of drive shaft 34 having worm 35 which operatively engages worm wheel 36 on the drum. Movements of shaft 22 communicate corresponding movements to shaft 15 through the instrumentality of drum 31, by the following means: At the outer end of shaft extension 22' there is mounted an arm 37 adapted to have a limited angular play in slot 38 in shaft extension 15'. To this arm 37 is attached one end of a friction band 39 which, in its non-operative condition, has a light frictional engagement with the hub 32 of drum 31, this engagement being such as to permit an easy slipping with negligible resistance. The outer end of this band is attached to leg 40' of bell crank lever 40 which is pivotally mounted on disc 41 fixed to shaft extension 15' to turn therewith. A second friction band 42 is pivotally attached at one end to pin 41' fixed to disc 41 and at the other end to the second leg 40'' of bell crank lever 40. In its non-operative state this band also has a light frictional engagement with the inner surface of flange 33 of the drum. An angular movement of shaft 22 in a clockwise direction, as viewed in Fig. 4, causes band 39 to grip hub 32 and the resulting pull on the outer end of band 39 pulls leg 40' inwardly to pivot bell crank lever 40 and by the resulting movement the leg 40'' brings band 42 against flange 33 to grip same, causing the disc 41 and thereby shaft 15 to rotate in the same direction as drum 31 and also of course shaft 22. So long as the angular movement of shaft 22 continues, that is so long as the rotor elements of the control motor B continue to rotate, the gripping action of the bands on the drum will persist and shafts 15 and 22 will move together, the clockwise movement of shaft 15 communicating a corresponding movement to that of shaft 22.

Obviously the drum 31 is not so coupled to disc 41 that there is no relative movement between them. Actually, the drum will be rotated at a greater speed than any speed which shaft 22 and disc 41 may attain; the clutching engagement between the friction bands and the parts of the drum 31 being of the slipping friction type. Because of the fact that the drum is being positively driven by the external motor D and because of the clutching engagement between the drum and shaft 22, due to the action of the wrapping friction, energy will be fed from the external motor D to shaft 15.

Upon cessation of movement of shaft 22, of control motor B, rotation of shaft 15 ceases as even a slight movement of shaft 15 when shaft 22 is stationary is sufficient to loosen the bands.

In its specific application as a fluid meter the pump shaft 15 is connected by a train of gearing 43 with a suitable indicating device.

While this device is represented as applied to the metering of gas, the pump being connected to indicating member, it is obvious that it may be applied for any purpose whatever where it is desired to obtain movement of a member or members which in amount bears a definite relation to the amount of fluid traversing the conduit. In this broad sense my device is a measuring mechanism: It produces a movement of a member which in amount is a measure of the amount of fluid flow.

The form just described is suitable for devices having a fluid flow in one direction only. Where it is desired to have a flow of fluid in either of two directions it is necessary to provide a modification of device C for communicating the motion of the control motor to the pump and providing the power input from a power driven member. A suitable arrangement is shown in Figs. 6 and 7. Here the pump operating shaft 46 is rotatably mounted in supports 47 and 48. The end of control shaft 49, adapted to be actuated by the control motor, extends into the recess 50 in the end of pump shaft 46. Rotatably mounted on pump shaft 46 are drums 51 and 52 having the outer worm wheels 53 and 54 respectively, engaging worms 55 and 56 keyed to shafts 57 and 58. Shaft 57 is constantly driven from a suitable source of power. Keyed to shafts 57 and 58 are the intermeshing spur gears 59 and 60. Obviously these gears will turn in opposite directions with the result that drums 51 and 52 will turn in opposite directions.

Keyed to pump shaft 46 is a member 61 having an arm 61' extending radially from this shaft provided with an outer end portion 61'' upon which are studs 62 and 63 disposed within drums 51 and 52 respectively. Fixed to control shaft 49 is arm 64 having branches 64' and 64''. Within drum 51 and lightly engaging the inner surface thereof frictionally is the flexible band 65, one end of which is attached to stud 62 of member 61 and therefore operatively connected to pump shaft 46, and the other end is attached to branch arm 64' and therefore operatively connected to the control shaft 49. In a similar way friction band 66 is attached in drum 52 at one end to stud 63 on member 61 and therefore, operatively, to pump shaft 46, and at its other end to branch 64'' and therefore, operatively, to control shaft 49; this band also lightly engaging the inner surface of this drum.

The operation of this structure is obvious. Movement of the control shaft in either direction in response to a pressure differential on the two sides of the pump in the fluid conduit results in bringing one or the other of bands 65 and 66 into closer engagement with one of the drums thereby to effect a corresponding movement of pump shaft 46 with the consequent operation of the pump in a direction to eliminate, or tending to eliminate, the pressure differential.

It should be noted that there is a very close correspondence in movement between the control motor and the pump, the movements of the control motor and pump shafts being practically simultaneous and of the same angular extent. In Fig. 8 a form of the invention is shown in which this feature is taken advantage of. The device is similar to that of Figs. 1 to 5, inclusive, except in the following respect. Gears 25 and 26 of Fig. 1 are omitted, shaft 23 of the control motor being geared to an extension 67 of shaft 16 of the pump by means of spur gears 68 and 69 and the intermediate idler gear 70. By this arrangement the effect of gear friction on the control motor is eliminated, a situation where of course all friction should be reduced to a minimum; the friction in the new arrangement due to gears 68, 69 and 70 not being of any significance in view of the fact that the pump and therefore also these gears are driven by an external source of power.

Of the forms of the invention thus far mentioned the devices have been designed to effect a pumping operation whenever the differential of pressures in the direction of flow is of any appreciable amount. In this type of device the predetermined differential of pressure is therefore any amount exceeding zero. The principle of my invention, however, can be so applied as to make the predetermined differential of pressure exceed any predetermined value.

For example, Fig. 9 discloses an arrangement where there is a definite fall of head in the direction of flow. The arrangement indicated in this figure is the same as that shown in Fig. 1 except for the means whereby the predetermined difference of pressure is produced. While in the device of Fig. 1 the supply side of the conduit containing the pump is directly connected by means of a by-pass pipe with the control motor, in the device of Fig. 9 the by-pass pipe 71 enters the receptacle 72 which latter is connected to the control motor by means of pipe 73. Receptacle 72 contains a liquid 74 in which the outlet end 71' is immersed. Obviously with an arrangement of this sort a pressure differential on the two sides of the pump sufficient to actuate the control motor and thereby to operate the pump must exceed the head of liquid above the exit of pipe 71. By varying the depth of this liquid in the receptacle or the position of the exit of pipe 71 therein the desired differential of presure may be secured.

Figs. 10 and 11 show an arrangement in which the differential of pressures effective to produce a flow involves a predetermined rise in pressure in the direction of flow; that is the pressure on the delivery side of the pump is normally greater by a predetermined amount than the pressure on the supply side. This effect or purpose is accomplished by the use in the connecting mechanism C of means to effect a relative movement of the control and pump shafts to operatively engage the friction band with the drum for causing a pumping action independent of the control motor until a back pressure is produced sufficient for the particular predetermined differential desired.

Mechanism C of this form of the invention is similar to that of the first described form, as will be evident from comparing Fig. 11 with Fig. 5. The pump shaft 15 is provided with a hollow extension 75 adapted to receive the control shaft 22. Keyed to the outer end of this extension 75 is disc 76 to which is attached in a marginal region, one end of tension spring 77, the other end of this spring being attached to another disc 78 which is keyed to control shaft 22. Naturally the tension of spring 77 will tend to move the two discs and consequently the control and pump shafts in opposite directions to effect a tightening of the engagement of the friction band 42 with drum 31 with the resultant pumping movement of shaft 15 and the operation of pump A which action will continue until the back pressure of the fluid is sufficient to neutralize the tension of spring 77 to loosen band 42 on the drum.

Obviously such a device as this just presented could be varied to produce a normal pressure differential such that the pressure on the supply side of the pump would be greater than that on the consumption side. For example, this effect could be obtained by providing a compression spring in place of the tension spring; or the tension spring of Fig. 12 could be placed so as to reverse the direction of movements, or tendency to move, of discs 76 and 78.

Fig. 12 diagrammatically represents a form of this invention in which the essential principle is applied to mechanisms involving reciprocating instead of rotary motion. In this embodiment of the invention the main stream of fluid is passed through a conduit system which includes a reciprocatory pump A', the fluid entering first on one side of a reciprocatory piston and then on the other, the opposite sides of the piston being by-passed by conduit pipes, the passage of fluid through which operates an easily movable reciprocatory piston in a control motor B'. As in the previously described arrangements, the moving parts of the control motor and pump are connected by means which include a flexible member having wrapping frictional engagement with a rotating driving mechanism C'.

The pumping mechanism A' comprises piston 80 mounted for reciprocating movement in cylinder 81 and having the usual piston rod 80'. This piston rod 80' is connected at 82 to pitman 83 pivotally attached at 84 to lever 85 which latter is pivoted at 86 to the frame work. Lever 85 carries the weight 85' normally tending to lower piston 80.

Cylinder 81 receives fluid from pipe 87 through branch pipes 88 and 89, opening into cylinder 81 at the lower and upper ends respectively, on opposite sides of the piston. Gravity actuated valve 90 controls the admission of fluid at the lower opening in the well known way, while valve 91 closed by action of tension spring 92 controls the opening and closing of the upper inlet opening. Similarly the fluid passes from the cylinder through outlet openings 93 and 94 controlled by valves 95 and 96 into branch pipes 97 and 98 and thence into the main outlet pipe 99. Piston 80, and its piston rod 80' fits the cylinder tightly so as to prevent fluid leakage between it and the cylinder wall and therefore it will not easily respond to small differences of fluid pressure. Means accordingly are provided in the form of control motor B' and device C' which act to control movement of the large piston and to supply energy to the large piston from an external source.

Control motor B' comprises piston 100 which reciprocates with a minimum of friction in cylinder 101, means being provided for admitting fluid alternately to opposite sides of the piston from pipes 102 and 103 connected respectively to the supply and consumption sides of pump A'. Piston rod 100', carrying piston 100, is connected by means of the flexible friction member 104 to lever 85 at 105. This frictional member passes several turns about drum 106 which rotates constantly being fixed to power driven shaft 107.

Mounted on the outside of cylinder 101 of control motor B' is a fluid box 109, the interior of which is in communication with by-passing pipe 103 and also with the interior of cylinder 101 through ports 110 and 111 at opposite ends of the cylinder. The admission and outlet of fluid through the ports is controlled by means of slide valve 112 which reciprocates within the fluid box 109. This valve has a recess portion 112' of sufficient length to bridge one of the ports and a substantial portion of a recess 113 in the exterior of the cylinder casting, which recess communicates with inlet by-pass pipe 102. Slide valve 112 is connected by means of a valve stem 114 to one end of lever 115 pivoted at 116 to the frame work. The other end of lever 115 is pivoted to rod 117 which slides in a recess in member 118 on lever 85. Rod 117 is provided with the spaced stops 119 and 120.

The operation of this mechanism will be readily apparent. Assuming the parts to be in the positions indicated in Fig. 12: If the pressure in inlet pipe 87 is the same as that in outlet pipe 99, the pressure in by-pass pipes 102 and 103 and consequently the pressure on opposite sides of piston 100 will be the same. Upon lowering the pressure in pipe 99, say, for example, in the consumption of gas, a differential of pressure will be produced in the by-pass pipes 102 and 103 and a greater pressure will therefore be present on the upper side of piston 100 than on the lower side, with the consequent downward movement of piston 100, the fluid entering through port 111 from the space comprised by recess 112' in slide valve 112 and recess 113 in the exterior of cylinder casing 101, and passing from cylinder 101 by way of port 110 into the chamber of fluid box 109. This downward movement of piston 110 tightens the band 104 about drum 106 resulting in the elevation of lever 85 through energy furnished by the rotating drum. This movement of the lever of course elevates piston 80 with the resultant opening of valve 90, the inflow of fluid from pipe 88 and the outlet of fluid into pipe 98.

When piston 80 approaches the upper limit of its upward movement, member 118 on lever 85 strikes stop 120 on 117 lifting it and thereby causing the downward movement of slide valve 112 so that recess 112' bridges port 110 and a substantial portion of recess 113, thereby admitting fluid to the space beneath piston 100 with the obvious result of reversal of direction of movement of piston 100. When this moves upwardly weight 85' acts to lower lever 85 and therewith piston 80. Obviously the rate of downward movement of piston 80 is determined by the upward movement of piston 100 in control motor B'. This downward movement of piston 80 causes the opening of valve 95 and the passage of fluid outwardly of the cylinder into pipe 97 while fluid is passing inwardly from pipe 89 through the opening having valve 91. Near the completion of the downward stroke of piston 80 and the upward stroke of piston 100, member 118 engages stop 119 to elevate slide valve 112 into the first mentioned position.

This reciprocation of piston 80 with the consequent flow of fluid through the system will continue until the pressure differential between the fluids in pipes 87 and 99 has been eliminated, thus eliminating the motive power for control motor B'.

Thus it will be seen that here also, as in the previously described forms, a by-pass stream of fluid actuates an easily operable element which serves to effect the actuation of a pumping mechanism during the continuance of a predetermined pressure differential on opposite sides of the pump, which operation continues until the pressure difference has been eliminated. Here too, the energy for actuating the pumping mechanism is from an external source of power.

Having thus described my invention what I claim as new and desire to secure by Letters Patent is:

1. In a measuring mechanism, a fluid conduit, a pump in the conduit, a pump actuated shaft, a conduit by-passing the pump, a control motor in the by-passing conduit adapted to be actuated by a predetermined differential of pressure on opposite sides of the pump, a shaft actuated by the control motor, a power driven rotating member, and means operatively connecting the control motor shaft and pump shaft and including a flexible friction member in wrapping frictional engagement with the power driven rotating member.

2. In a measuring mechanism, a fluid conduit, a pump in the conduit, an easily movable member, means for establishing communication between said easily movable member and the fluid in the conduit so that said member is adapted to be actuated during the continuance of differentials of fluid pressure on opposite sides of the pump, a constantly driven power member and means connecting the pump and easily movable member and including a flexible friction member having wrapping frictional engagement with said power member during movement of the easily movable member to drive said pump during the continuation of movement of said easily movable member.

3. In a measuring mechanism, a conduit, a pump in the conduit, a motor insufficient of itself to operate the pump, means communicating with the conduit on opposite sides of the pump to convey fluid pressure to said motor so that said motor is operated in response to a predetermined differential of fluid pressures on opposite sides of the pump, means constantly connecting the motor and the pump, a power driven member, and means responsive to the movement of the motor to operatively engage the connecting means and the power driven member during movement of the motor.

4. In a fluid meter, a fluid conduit, a pump in the conduit, indicating means operated by the pump, a conduit by-passing the pump and of small capacity compared with the pump conduit, a control motor in the by-passing conduit adapted to be operated by the flow of fluid in the by-passing conduit, a power driven rotating member, and means connecting the control motor and pump and including a flexible friction member having wrapping frictional engagement with the power driven member and adapted to establish a driving connection between the power driven member and the pump during the operation of the control motor.

5. In a measuring mechanism, a fluid conduit, a pump in the conduit, a conduit by-passing the pump, a control motor in the by-passing conduit, a power driven rotating member, means connecting the pump and control motor and including a flexible friction member having wrapping frictional engagement with the power driven rotating member, and means for producing a predetermined differential of fluid pressures on opposite sides of the pump.

6. In a fluid meter, a fluid conduit, a rotary fluid metering means mounted therein, a conduit by-passing said rotary fluid metering means, a rotary member in the by-passing conduit and adapted to be rotated as a result of the flow of fluid in said by-passing conduit, a power driven member, and means actuated by said rotary member for rotating said rotary fluid metering means by power from said power driven member.

7. In a fluid meter, a fluid conduit, a metering means mounted therein, a conduit by-passing said metering means, a movable member in the by-passing conduit and adapted to be moved as a result of the flow of fluid in said by-passing conduit, a power driven member, and means actuated by the movable member in the by-passing conduit for moving said metering means by power from said power driven member.

8. In a fluid meter, a fluid conduit, a movable metering member mounted therein, a conduit by-passing said movable metering member, a movable member mounted in the by-passing conduit and adapted to be moved by the flow of fluid in the by-passing conduit, a rotating power driven drum, a flexible friction member wrappingly engaging said drum, and means for connecting said flexible friction member to said movable metering member and said movable member in the by-passing conduit.

9. In a fluid meter, a fluid conduit, a rotary metering member therein, a conduit by-passing said rotary metering member, a rotary member mounted in the by-passing conduit and adapted to be actuated by the flow of fluid therein, a power driven member, and means for rotating said rotary metering member by power from the power driven member in unison with the rotation of the rotary member in the by-passing conduit.

10. In a fluid meter, a fluid conduit, a rotary metering member therein closely fitting the conduit, a conduit by-passing said rotary metering member, a rotary member in the by-passing conduit loosely fitting therein and adapted to be easily rotated by the flow of fluid in the by-passing conduit, a power driven member, and means including a flexible friction member connecting the rotary metering member and the rotary member in the by-passing conduit and actuated by rotation of the rotary member in the by-passing conduit to engage the power driven member during such rotation to drive the rotary metering member with a movement corresponding to the movement of the rotary member in the by-passing conduit.

11. In a fluid meter, a fluid conduit, a movable fluid metering means mounted therein, a conduit by-passing said movable fluid metering means, a member in the by-passing conduit adapted to be moved as a result of the flow of fluid in said by-passing conduit, a power driven member, and means actuated by the movable member in the by-passing conduit for moving said movable fluid metering means by power from said power driven member.

12. In a fluid meter, a fluid conduit, a rotary metering member therein closely fitting the conduit, a conduit by-passing said rotary metering member, a rotary member in the by-passing conduit loosely fitting therein and adapted to be easily rotated by the flow of fluid in the by-passing conduit, a power driven member, and means actuated by the rotary member in the by-passing conduit for rotating said rotary fluid metering means by power from said power driven member.

ROBERT S. A. DOUGHERTY.